(No Model.)

O. B. SHALLENBERGER.
ELECTRICAL INDICATOR.

No. 383,671. Patented May 29, 1888.

WITNESSES:

INVENTOR,
O. B. Shallenberger
by Pope Edgecomb & Terry, Att'ys.

UNITED STATES PATENT OFFICE.

OLIVER B. SHALLENBERGER, OF ROCHESTER, ASSIGNOR TO THE WESTINGHOUSE ELECTRIC COMPANY, OF PITTSBURG, PENNSYLVANIA.

ELECTRICAL INDICATOR.

SPECIFICATION forming part of Letters Patent No. 383,671, dated May 29, 1888.

Application filed January 21, 1888. Serial No. 261,470. (No model.)

*To all whom it may concern:*

Be it known that I, OLIVER B. SHALLENBERGER, a citizen of the United States, residing in Rochester, Beaver county, and State of Pennsylvania, have invented certain new and useful Improvements in Electrical Indicators, (Case 197,) of which the following is a specification.

The invention relates to the class of electrical apparatus employed for indicating the strength of current upon an electric circuit.

The object of the invention is to provide convenient, effective, and reliable means for determining the difference of potential existing between two given points in an electric circuit supplied with alternating, intermittent, or pulsatory electric currents.

The present invention consists in so organizing a Wheatstone bridge or equivalent circuit that when currents of the character named are caused to traverse it a counter electro-motive force will be developed in one or more of the conductors, which will increase the apparent resistance thereof. This counter electro-motive force will increase and decrease as the applied electro-motive force varies. By properly organizing the indicating-circuits such changes in the distribution of differences of potential may be secured as to effect the proper operation of the indicating apparatus.

Figure 1:
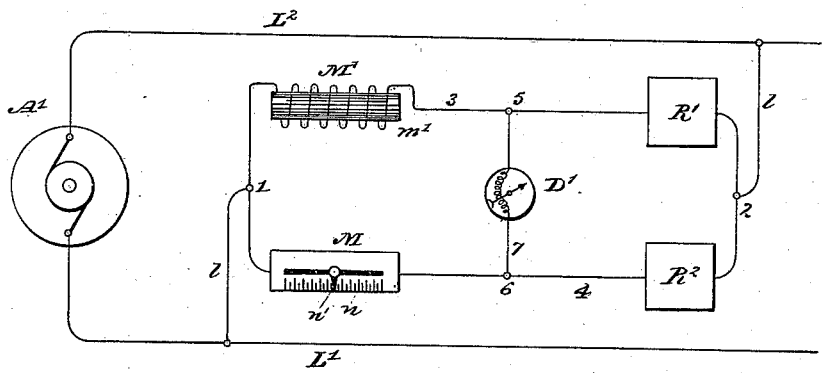
Figure 2:
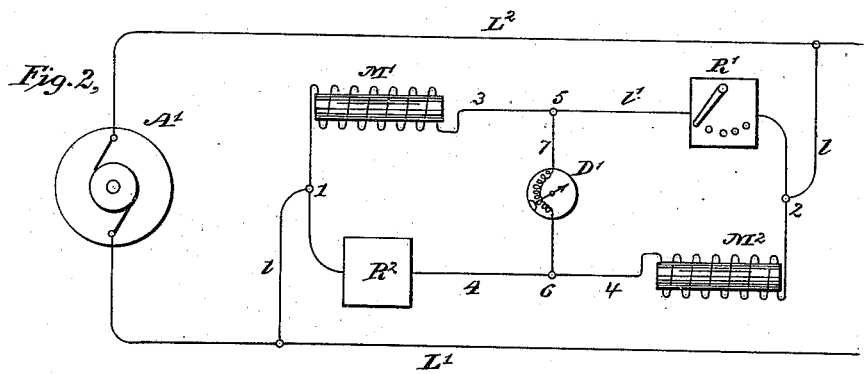
Figure 3:
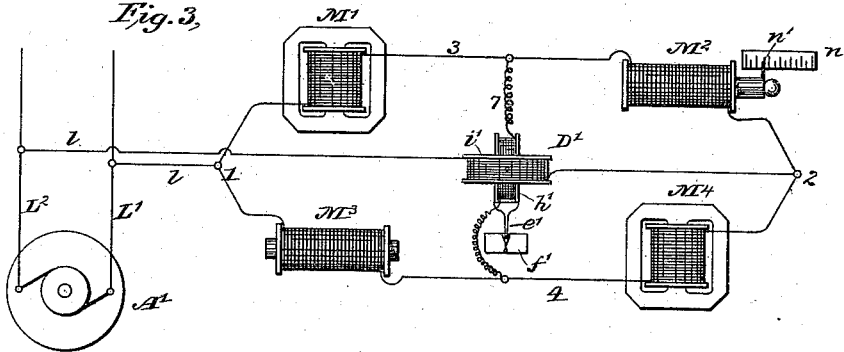

In the accompanying drawings, Figure 1 is a diagram illustrating the general organization of circuits and apparatus for carrying out the invention. Figs. 2 and 3 illustrate modifications.

Referring to Fig. 1, A' represents a suitable source of alternating, intermittent, or pulsatory electric currents; and L' L², main-line conductors derived therefrom and leading to any desired work-circuit. Between the lines L' and L² there is connected a conductor, $l$, divided at points 1 and 2 into branches 3 and 4. A conductor, 7, extends from a point, 5, in the conductor 3 to a point, 6, in the conductor 4. In this conductor 7 there is included any suitable form of indicating device—such, for instance, as indicated at D'. This may be a galvanometer or other convenient form of device operated by currents flowing through the conductor 7.

A self-induction device, M', consisting of a coil applied to a core, $m'$, is connected in the conductor 3, between the points 1 and 5. The apparent resistance of this core has a given law of variation under changes in current traversing it, since the counter electro-motive force developed in it increases and decreases with the variations in the difference of potential applied thereto. The conductor 3 also includes a constant resistance, R', between the points 2 and 5. The branch 4 includes a similar constant resistance, R², between the points 2 and 6 and an adjustable resistance, M, between the points 1 and 6. This adjustable resistance is provided with a pointer, $n'$, applied to a scale, $n$, by means of which the amount included in circuit may be determined.

Normally the resistances are so adjusted that with a given difference of potential between the points 1 and 2 the difference of potential at the points 5 and 6 will be equal, and therefore no current will flow through the conductor 7; but if the difference of potential between the points 1 and 2 varies from the predetermined amount then a change in the counter-electro-motive force of the device M' will follow, although its resistance remains constant, while the resistances R' and R² and M remain also approximately constant. This will cause a consequent difference of potential between the points 5 and 6 and a current will flow in a corresponding relative direction through the conductor 7. In this manner the indicator will readily show if the electro-motive force has risen too high or fallen too low.

By adjusting the resistance M in one direction or the other and noting the result upon the indicator D' the direction in which the change has occurred may be determined and also the amount, for as soon as it is made equivalent to the apparent resistance of the self-induction device M' the indicator D' will return to its normal position.

In Fig. 2 a modification is shown in which two self-induction devices are used, as shown at M' and M². This secures a greater sensitiveness on the part of the instrument. In this instance the resistance R' is shown as being adjustable, and the resistance R² is shown as located between the points 1 and 6. It will be noticed in this organization that if the change in the difference of potential between the points 1 and 2 is such as to increase the apparent resistance of the devices M' and M², then the point 5 will have its difference of potential changed to a value nearer that of 2, while the point 6 will be nearer that of 1; consequently the indicator D' will be affected more than in the organization shown in Fig. 1, where the difference of potential of the point 5 only is changed. By adjusting the resistance R' a balance may be secured.

In Fig. 3 an organization is shown in which four self-induction devices are employed, as shown at M', M², M³, and M⁴. These have different laws of change under given changes in the difference of potential, but each possesses a certain amount of self-induction. The distribution of the differences of potential is effected by any change in the difference of potential on the circuit to which it is applied, after the general manner already described. The device M² is shown as having its core adjustable, an indicator, n', being applied to the scale n. In this instance the indicator D' consists of two coils, i' and h', placed at an angle with each other. The coil h' is included in the conductor 7 and the coil i' is included in the conductor l at a point outside of the branches 3 and 4. Thus all the current that traverses the two branches must traverse the coil i'. This current will be always in the same relative direction to the currents in the arms of the bridge, notwithstanding the changes in the direction of the current through the conductor 7, and therefore the indicator will readily show whether the difference of potential at the points 3 and 4 has risen above or fallen below the normal.

I claim as my invention—

1. An indicator for alternating, intermittent, or pulsatory electric circuits, consisting of two branch conductors, one branch containing a device of variable self-induction under variations in the difference of potential applied thereto, a device in the other branch opposing the flow of current therethrough, a conductor connecting points in said branch conductors, and an indicator affected by currents traversing said connecting conductor, substantially as described.

2. An indicator for alternating, intermittent, or pulsatory electric circuits, consisting of a conductor having two branches, self-induction devices included in the respective branches, an indicating device included in a conductor uniting the two branches, and resistance devices included in the respective branches in shunt-circuit upon the respective self-induction devices and the indicating device.

3. An indicator for alternating, intermittent, or pulsatory electric circuits, consisting of an electric conductor having two branches, a self-induction device and an artificial resistance included in one branch, two resistance devices included in the other branch, an electric conductor uniting intermediate points in the two branches, and an indicating device in the last-named conductor.

4. An indicator for alternating, intermittent, or pulsatory electric circuits, consisting of an electric conductor having two branches, a self-induction device and an artificial resistance included in one branch, a second resistance and an adjustable resistance device included in the other branch, an electric conductor uniting intermediate points in the two branches, an indicating-coil in the last-named conductor, and a second indicating-coil included in the first-named conductor and applied to the other indicating-coil, substantially as described.

5. In an indicator for alternating, intermittent, or pulsatory electric currents, the combination of the conductor l, having branches 3 and 4, the conductor 7, uniting said branches, the indicator D', included in the conductor 7, a self-induction device, M', included in the branch 3, a device in the corresponding conductor, 4, whose rate of change of apparent resistance is different from that of the device M', and means for causing a current to pass through the conductor 7 in one direction or the other, accordingly as the counter electromotive force of the device M' rises above or falls below that of the corresponding device in the conductor 4.

6. An indicator for periodically-variable currents, consisting of two circuits of approximately constant specific resistance having points of equal normal difference of potential, a coil of self-induction included in one of said circuits, and an indicator connected between the points of equal potential.

7. The combination of the circuit traversed by variable electrical currents, two circuits connected in shunt thereto, of approximately constant specific resistance, a coil of self-induction included in one of said circuits adapted to vary the distribution of differences of potential in its circuit under variations of difference of potential in the main circuit, and an indicator connected to a point in each of said shunt-circuits.

8. An indicator for alternating, intermittent, or pulsatory electric circuits, consisting of two circuits in multiple arc, one of which contains a coil of self-induction adapted to vary the distribution of differences of potential on said circuits under variations of difference of potential applied thereto, and an indicating device connected across said circuits to indicate such variations of potential.

9. The combination of a source of alternating, intermittent, or pulsatory electric currents, an electrical circuit arranged as the arms of a Wheatstone bridge, one of said arms including a portion having a variable self-induction under variations of current traversing it, and an indicator connecting two intermediate points in said circuits.

In testimony whereof I have hereunto subscribed my name this 10th day of January, A. D. 1888.

OLIVER B. SHALLENBERGER.

Witnesses:
W. D. UPTEGRAFF,
DANL. W. EDGECOMB.